(12) United States Patent
Sunaoshi

(10) Patent No.: US 6,853,879 B2
(45) Date of Patent: Feb. 8, 2005

(54) MEDICAL MANIPULATOR AND METHOD OF CONTROLLING THE SAME

(75) Inventor: Takamitsu Sunaoshi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/214,554

(22) Filed: Aug. 9, 2002

(65) Prior Publication Data

US 2003/0033024 A1 Feb. 13, 2003

(30) Foreign Application Priority Data

Aug. 10, 2001 (JP) .......................................... 2001-243434

(51) Int. Cl.⁷ .......................... G05B 19/04; G05B 19/18
(52) U.S. Cl. ....................... 700/253; 700/213; 700/245; 700/248; 700/251; 700/257; 700/259; 700/260; 700/261; 700/262; 700/264; 318/568.11; 318/568.13; 318/568.16; 318/568.2; 318/568.22; 600/102; 600/103; 600/109; 600/117; 600/118; 600/587; 600/229; 606/130; 606/139; 606/142; 606/170; 606/201; 606/206; 606/208; 901/19; 901/27; 414/1; 414/4
(58) Field of Search ................................ 700/260, 213, 700/245, 248, 251, 253, 257, 259, 261, 262, 264; 318/568.11, 568.13, 568.16, 568.2, 568.22; 600/102, 103, 109, 117, 118, 587, 229, 429; 606/130, 139, 142, 170, 206, 208, 1; 901/19, 27; 211/105.1, 123; 414/1, 4

(56) References Cited

U.S. PATENT DOCUMENTS

| | | | | |
|---|---|---|---|---|
| 3,923,166 A | * | 12/1975 | Fletcher et al. ................. | 414/4 |
| 5,762,458 A | * | 6/1998 | Wang et al. ..................... | 414/1 |
| 5,971,976 A | * | 10/1999 | Wang et al. ..................... | 606/1 |
| 6,001,108 A | * | 12/1999 | Wang et al. .................. | 606/130 |
| 6,080,181 A | * | 6/2000 | Jensen et al. ................ | 606/205 |
| 6,331,181 B1 | * | 12/2001 | Tierney et al. ............... | 606/130 |

(List continued on next page.)

FOREIGN PATENT DOCUMENTS

| | | |
|---|---|---|
| JP | 4-68410 | 3/1992 |
| JP | 8-25258 | 1/1996 |
| JP | 8-215204 | 8/1996 |
| JP | 2000-350735 | 12/2000 |

OTHER PUBLICATIONS

Mack, Minimally invasive and robotic surgery, 2001, Internet, pp. 568–572.*
Butner et al. A real–time system for tele–surgery, 2001, IEEE, pp. 236–243.*
Hayashibe et al., Laser–pointing endoscope system for intra–operative 3D geometric registration, 2001, IEEE, pp. 1543–1548.*
Computermotion, 2000 computermotion annual report, defining success, 1–42.*

Primary Examiner—William A. Cuchlinski, Jr.
Assistant Examiner—McDieunel Marc
(74) Attorney, Agent, or Firm—Oblon, Spivak, McClelland, Maier & Neustadt, P.C.

(57) ABSTRACT

A medical master/slave manipulator is excellent in operability and capable of reducing burden on the operator. The medical master/slave manipulator includes a master unit provided with an operation control portion, a slave unit provided with a working device, an interlocking mechanism interlocking the slave unit with the master unit, an orientation difference measuring mechanism for measuring the orientation difference between the orientation of the master unit and that of the slave unit, and a control mechanism for controlling the slave unit to adjust the orientation of the slave unit to that of the master unit so that the orientation difference is reduced to zero in a transient master/slave operation mode in which an operation mode changes from an unrestricted operation mode to a master/slave operation mode.

19 Claims, 5 Drawing Sheets

U.S. PATENT DOCUMENTS

| | | | |
|---|---|---|---|
| 6,364,888 B1 * | 4/2002 | Niemeyer et al. | 606/130 |
| 6,377,011 B1 * | 4/2002 | Ben-Ur | 318/566 |
| 6,424,885 B1 * | 7/2002 | Niemeyer et al. | 700/245 |
| 6,594,552 B1 * | 7/2003 | Nowlin et al. | 700/260 |
| 2002/0097761 A1 * | 7/2002 | Sucha et al. | 372/30 |
| 2002/0120363 A1 * | 8/2002 | Salisbury et al. | 700/254 |

* cited by examiner

MEDICAL MANIPULATOR AND METHOD OF CONTROLLING THE SAME

CROSSREFERENCE TO RELATED APPLICATIONS

This application is based upon and claims the benefit of priority from the prior Japanese Patent Applications No. 2001-243434 filed on Aug. 10, 2001; the entire contents of which are incorporated herein by reference.

TECHNICAL FIELD

The present invention relates to a medical manipulator and a method of controlling the same and, more particularly, to a medical master/slave manipulator and a method of controlling the same.

BACKGROUND ART

A laparoscopic operation, such as a laparoscopic cholecystectomy, forms a small incision in the patient's abdominal wall, inserts a trocar tube in the small incision, inserts an endoscope and a pair of forceps through the trocar tube into the peritoneal cavity, and the operator conducts a surgical operation, visually watching an image taken by the endoscope and displayed on the screen of a monitor. Since the laparoscopic operation does not involve laparatomy, a burden on the patient is small, the patient recovers quickly after the operation, and the number of days for which the patient needs to stay at the hospital after the operation is reduced greatly. Thus, the laparoscopic operation is excellent in not exerting a large burden on the patient and the field of application of the laparoscopic operation is expected to expand. On the other hand, the laparoscopic operation does not permit the direct visual observation of the affected part, and requires techniques of skilled operators because only a difficult-to-operate pair of forceps provided with only a gripper capable of opening and closing is available.

Studies have been made to apply a medical master/slave manipulator including a control unit (master unit) having a plurality of degrees of freedom of motion, and a working unit (slave unit) having a plurality of degrees of freedom of motion and capable of reproducing the motions of the control unit to laparoscopic operations, and medical master/slave manipulators have been practically applied to laparoscopic operations. A remote-control master/slave manipulator of a complicated system includes a maser unit and a slave unit which are spaced a long distance apart. If the slave unit remote from the master unit should become out of control, the patient is exposed to a fatal danger. Therefore, it is possible that safety problems arise when the remote-control master/slave manipulator is applied to medical uses.

A simple, easy-to-operate connected medical master/slave manipulator has a common shaft common to a master unit and a slave unit. A known connected master/slave manipulator for the field of industrial robots has a master unit and a slave unit. In all those known manipulators, the orientation of the master unit is adjusted to that of the slave unit instead of adjusting the orientation of the slave unit to that of the master unit in a transient master/slave operation mode in which an unrestricted operation mode changes into a master/slave operation mode to reduce the orientation difference between the master unit and the slave unit to zero, because the adjustment of the master unit lying near the operator is easy and, in the operation of an industrial robot provided with a master unit and a large, heavy slave unit, the operation of the large, heavy slave unit for the adjustment of its orientation to that of the master unit is not practically feasible.

When operating a medical master/slave manipulator, the slave unit cannot be controlled as an operator likes and the medical master/slave manipulator is difficult to operate if the operation of the medical master/slave manipulator is started before the master unit and the slave unit are aligned. There have been proposed methods of aligning the master unit and the slave unit of master/slave manipulators. In a master/slave manipulator including a slave unit, a master unit, shape-recognizing means incorporated into the slave and the master unit, and a comparing means for comparing the results of recognition made by the shape-recognizing means, these methods require the operator to adjust the shape of the master unit to that of the slave unit, and then start the master/slave manipulator for a master/slave operation. Thus, in a transient master/slave operation mode in which an unrestricted operation mode changes into a master/slave operation mode, the master unit is so controlled as to adjust its orientation to that of the slave unit.

Thus, those known methods require the operator to perform a shape-adjusting operation for adjusting the shape of the master unit to that of the slave unit every time the master/slave operation is started or resumed. The operability of such a master/slave manipulator is not necessarily satisfactory. Since the adjusting operation must be performed for a plurality of degrees of freedom of motion, the shape-adjusting operation takes much time. In a medical manipulator capable of moving with degrees of freedom of motion and having a master unit that does not necessarily needs any degree of freedom of motion, such as a gripper, it is difficult to achieve shape-adjustment through the operation of only the master unit. These problems will make it difficult to take such steps as the occasion demands when an unexpected accident occurs during a practical operation.

DISCLOSURE OF THE INVENTION

Accordingly, it is an object of the present invention to solve those problems in the prior art and to provide a medical manipulator having a master unit and a slave unit, easy to control, and enabling adjusting the orientation of the slave unit to that of the master unit in a transient master/slave operation mode in which an unrestricted operation mode changes into a master/slave operation mode in which there is no difference in orientation between the master unit and the slave unit.

To achieve the foregoing object, the present invention provides a medical manipulator of a master/slave system comprising: a master unit provided with an operation control portion; a slave unit provided with a working device; an orientation difference measuring means for measuring an orientation difference between an orientation of the master unit and that of the slave unit; and a control means that controls the slave unit to adjust the orientation of the slave unit to that of the master unit so that the orientation difference is reduced to zero in a transient master/slave operation mode in which an unrestricted operation mode changes into a master/slave operation mode.

In the transitional master/slave operation mode for a period between the unrestricted master/slave operation mode and the maser/slave operation mode in which the orientation difference between the master unit and the slave unit is reduced to zero, the slave unit is controlled so as to reduce the orientation difference to zero and the slave unit is aligned with the master unit on the basis of the orientation difference measured by the orientation difference measuring means. Thus, the medical manipulator is easy to operate.

In the unitary medical master/slave manipulator, the slave unit operates in a limited operating space when the slave unit is operated to reduce the orientation difference to zero and hence there is no risk of the slave unit becoming uncontrollable.

The medical manipulator further comprises a control program defining the relation between the orientation difference and control time for a control period between the time of reception of a signal requesting transition from the unrestricted operation mode to the master/slave operation mode and the time when the orientation difference is reduced to zero, and the control means controls the slave unit according to the control program.

According to embodiments of the present invention, the medical manipulator of a master/slave system is provided with the control program defining the relation between the orientation difference and control time is able to adjust the orientation of the slave unit quickly and efficiently to that of the master unit.

The control program includes operation programs respectively assigned to the respective magnitudes of the orientation differences measured by the orientation difference measuring means, the control means selects one of the operation programs according to the magnitude of the orientation difference measured by the orientation difference measuring means, and controls the slave unit according to the selected operation program.

According to embodiments of the present invention, the control program can be simplified by using the magnitude of the orientation difference.

The operation programs included in the control program are an accelerated operation program for controlling the slave unit for an accelerated orientation difference reducing operation, a uniform-speed operation program for controlling the slave unit for a uniform-speed orientation difference reducing operation, and a decelerated operation program for controlling the slave unit for a decelerated orientation difference reducing operation.

According to embodiments of the present invention, the orientation difference between the master unit and the slave unit can be quickly, smoothly and surely reduced to zero by selectively using the accelerated operation program, the uniform-speed operation program and the decelerated operation program.

An acceleration at which the slave unit is moved for the accelerated orientation difference reducing operation according to the accelerated operation program, a speed at which the slave unit is moved for a uniform-speed orientation difference reducing operation according to the uniform-speed operation program, and a deceleration at which the slave unit is moved for a decelerated orientation difference reducing operation according to the decelerated operation program are included in the control program.

The control means is capable of controlling the slave unit according to the accelerated operation program regardless of the magnitude of the orientation difference in a predetermined period after the reception of a signal requesting transition to the master/slave operation mode. Usually, the orientation difference between the master unit and the slave unit is large in the predetermined time after the control means has received the signal requesting transition to the master/slave operation mode. Therefore, the control means selects the accelerated operation program first to reduce the orientation difference to zero quickly.

The orientation difference measuring means measures orientation differences sequentially, and the control means refers to the control program for each of the sequentially measured orientation differences to control the slave unit.

According to embodiments of the present invention, the orientation difference is measured sequentially and the slave unit is controlled sequentially. Therefore, the master unit or the slave unit does not need to be kept stationary, and the orientation of the slave unit can be adjusted to that of the master unit even if the mater unit or the slave unit is moved to a desired orientation.

The control means refers to the control program for each of the sequentially measured orientation differences to control the slave unit when the orientation of the master unit changes with time.

The control means refers to the control program for each of the sequentially measured orientation differences to control the slave unit while the orientation difference is not reduced to zero and the orientation of the slave unit changes with time.

The orientation measuring means includes a first angle measuring device for measuring the angular position of the master unit, a second angle measuring device for measuring the angular position of the slave unit, and an orientation difference calculating device for calculating an orientation difference from angular positions measured by the first and the second angular position measuring device.

According to embodiments of the present invention, a method of controlling a medical manipulator of a master/slave system comprises: measuring an orientation difference between a master unit provided with an operation control portion, and a slave unit provided with a working device by an orientation difference measuring means in a transient master/slave operation mode in which an operation mode changes from an unrestricted master/slave operation mode changes to a master/slave operation mode and the orientation difference between the master unit and the slave unit is reduced to zero; and controlling the slave unit by a control means on the basis of an orientation difference measured by the orientation difference measuring means to adjust the orientation of the slave unit to that of the master unit so that the orientation difference is reduced to zero.

Thus, according to embodiments of the present invention, the operator does not need to perform a master-slave alignment operation intentionally, the medical master/slave manipulator has an improved operability, and the medical master/slave manipulator can be set for the master/slave operation mode without spoiling safety.

BEST MODE FOR CARRYING OUT THE INVENTION

A medical manipulator in a preferred embodiment according to the present invention will be described with reference to the accompanying drawings.

In the description of the present invention, the term "unrestricted operation mode" signifies a mode of operation, immediately after a medical manipulator has been connected to a power source, in which there is not any restriction on the relation between the respective orientations of the master unit and the slave unit of the medical manipulator, the term "master/slave operation mode" signifies a mode of operation in which the master unit and the slave unit are controlled so that the respective orientations of the master unit and the slave unit conform to a predetermined relation, and the term "transitional master/slave operation mode" signifies a mode of operation corresponding to an initial stage of the master/slave operation mode in which the operation mode is changing from the unrestricted operation mode to the master/slave operation mode and the respective orientations of the master unit and the slave unit are changing so as to conform to the predetermined relation specified for the master/slave operation mode.

Figure 1:
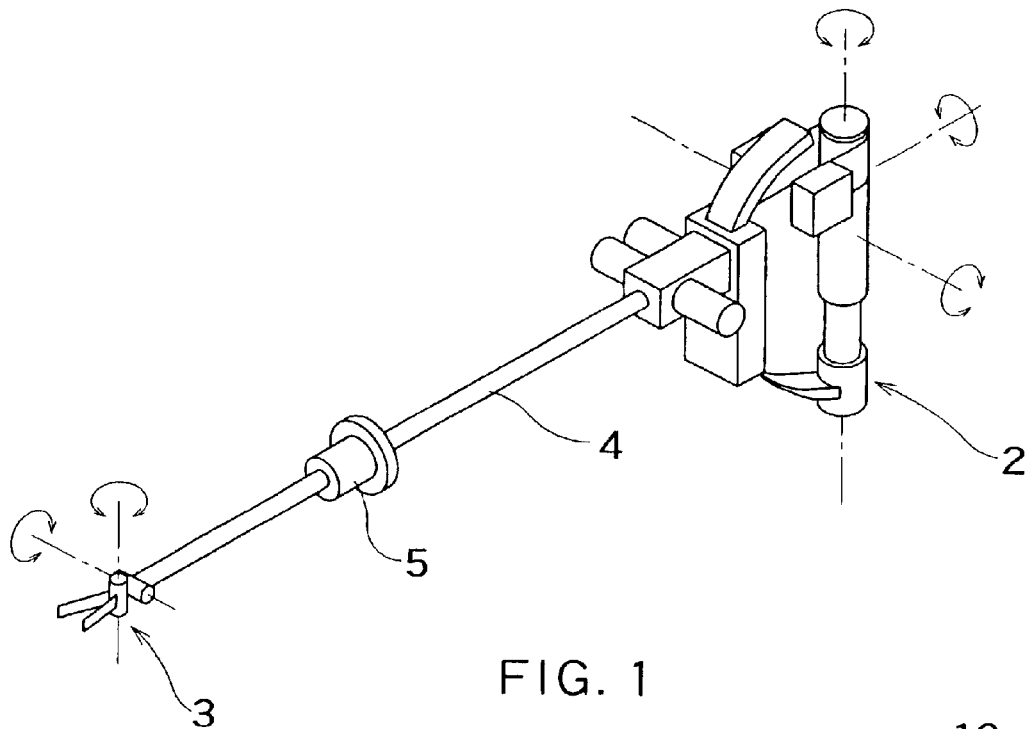
FIG. 1 is a perspective view of a medical manipulator including a master unit, a slave unit and an interlocking unit.
Figure 2:
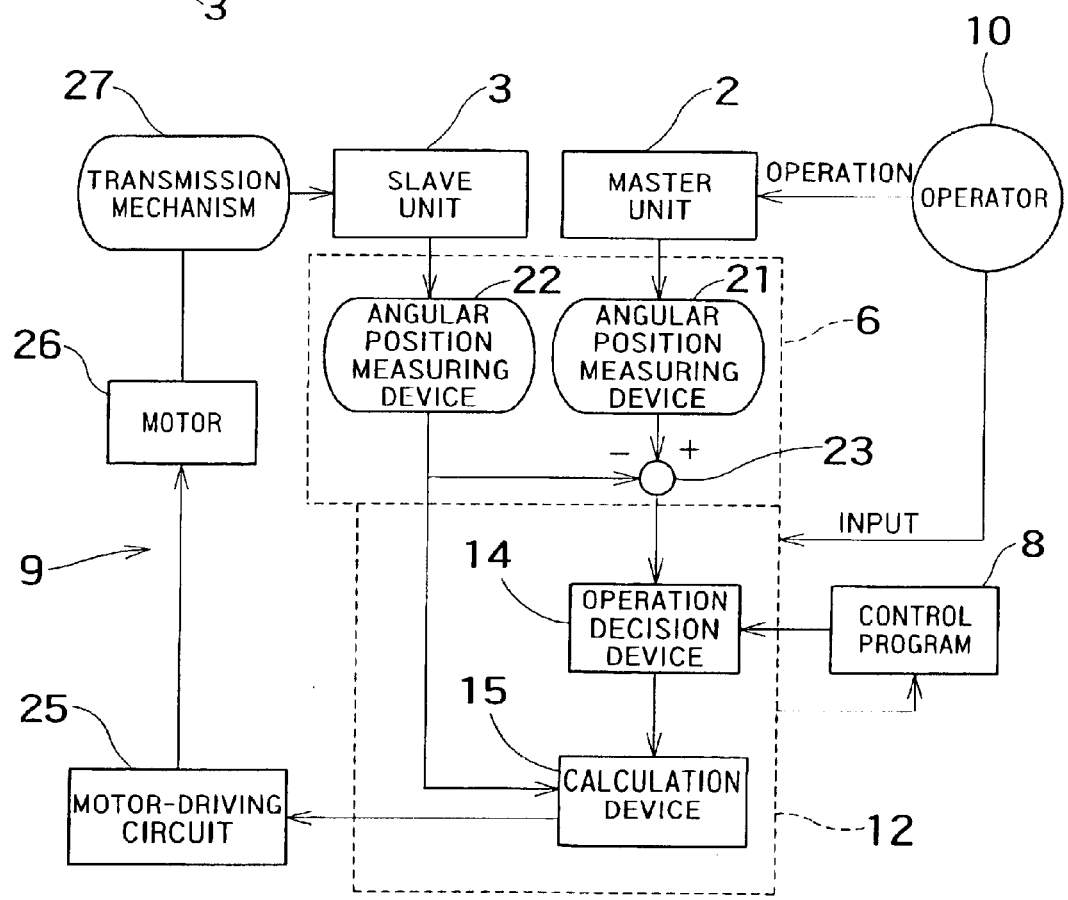
FIG. 2 is a block diagram of the medical manipulator.
Figure 7:
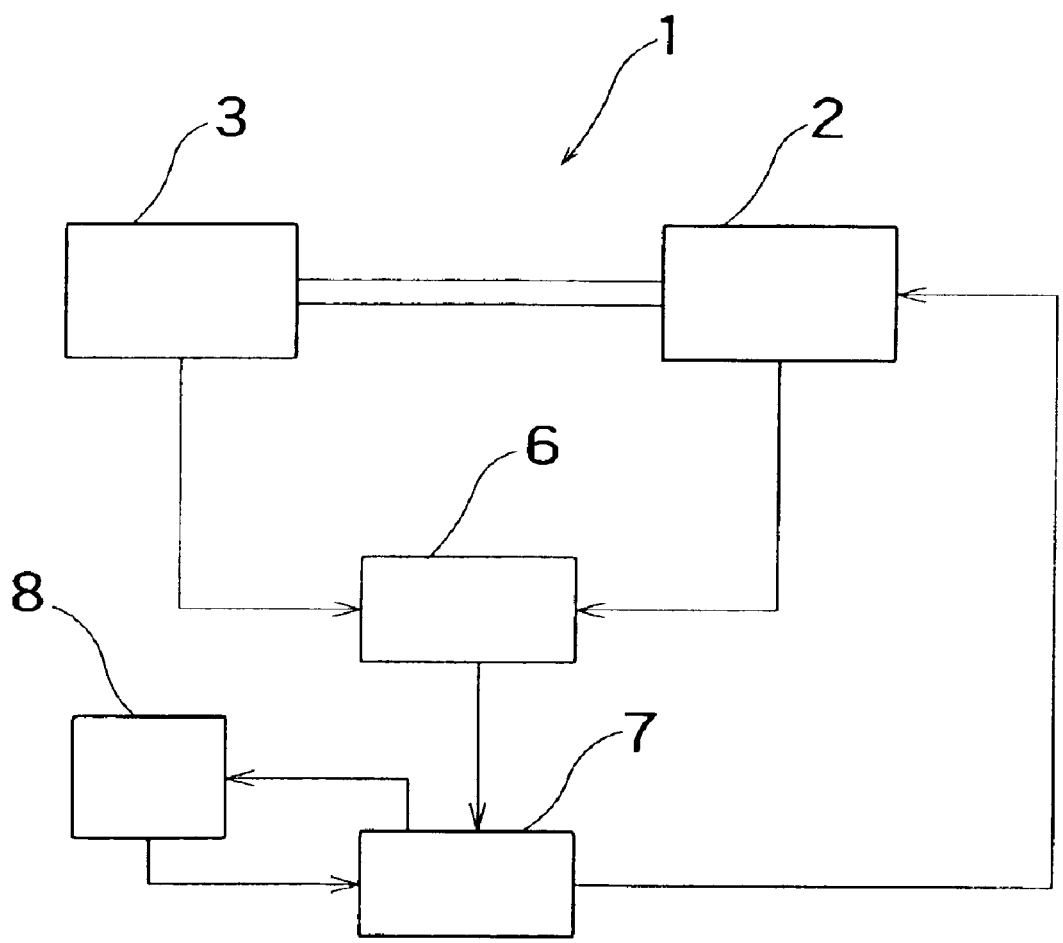
FIG. 7 is a block diagram of assistance in explaining the control of the medical manipulator.

Referring to FIGS. 1, 2 and 7, a unitary medical manipulator 1 of a master/slave system (sometimes, referred to as "medical master/slave manipulator") has a master unit (control device) 2 to be controlled by an operator, a slave unit (working unit) 3 which reproduces motions of the master unit 2, an interlocking unit 4 interlocking the master unit 2 and the slave unit 3, an orientation difference measuring unit 6 for measuring the difference between the respective orientations of the master unit 2 and the slave unit 3 (orientation difference), a controller 7 that controls the slave unit 3 on the basis of the orientation difference measured by the orientation difference measuring unit 6 so as to reduce the orientation difference to zero, and a control program 8 defining the relation between the orientation difference and control time in the range of control time between the measurement of the orientation difference by the orientation difference measuring unit 6 and time when the orientation difference is reduced to zero by the control operation of the control unit 7.

The orientation difference measuring unit 6 includes an angle measuring device 21 for measuring the angular position of the master unit 2, an angle measuring device 22 for measuring the angular position of the slave unit 3, and an orientation difference calculating device 23 for calculating an orientation difference from angular positions measured by the angle measuring devices 21 and 22. The control unit 7 includes a driving device 9 and an arithmetic control device 12. The driving device 9 includes a motor-driving circuit 25, a motor 26 and a transmission mechanism 27 for transmitting the power of the motor 26 to the slave unit 3.

The slave unit 3 has a plurality of degrees of freedom of motion to achieve surgical operations. The slave unit 3 has a hand holding a gripper and capable of being set at a desired orientation. The gripper can be opened and closed according to instructions given by the operator. Joint-link pairs constituting the degrees of freedom of the slave unit 3 are operated by the power of the motor 26 transmitted thereto by the transmission mechanism 27 having wires and rods.

Encoders are combined with the drive shafts of the joint-link pairs, respectively, to measures the orientation of the slave unit 3. Signals provided by the encoders are transmitted to the arithmetic control device 12.

The master unit 2 has joint-link pairs constituting a plurality of degrees of freedom of motion. The degrees of freedom of the master unit 2 correspond directly to those of the slave unit 3, respectively. However, the operations of the master unit 2 do not necessarily similar to those of the gripper. For example, a switch included in the master unit 2 may be turned on and off to open and close the gripper. When the gripper is thus controlled by turning on and off the switch, the respective degrees of freedom of the master unit 2 and the slave unit 3 can be related with each other by relating the on and off states of the switch with the open and closed states of the gripper, respectively.

Potentiometers are combined with the joint-link pairs corresponding to the degrees of freedom of the master unit 2, respectively. Thus, motions of the joint-link pairs of the mater unit 2 are measured, and the orientation difference calculating device 23 calculates an orientation difference.

The orientation difference calculated by the orientation difference calculating device 23 is a vector quantity in three-dimensional space. The control program 8 includes a plurality of operation programs. A vector quantity calculated by the orientation difference calculating device 23 is specified by its magnitude, and reference is made to the operation program corresponding to the magnitude of the specified vector.

The arithmetic control device 12 includes an operation decision device 14. The operation decision device 14 refers to the control program 8 according to the magnitude of the orientation difference vector calculated by the orientation difference calculating device 23, and determines a desired orientation of the slave unit 3.

A command value for controlling the slave unit 3 is calculated from the measured present angular position of the slave unit 3 and the desired orientation determined by the operation decision device 14. For example, PID control is used in the calculation device 15. The command value is given to the motor driving circuit 25. In a master/slave operation mode, the angular position of the master unit 2 is the desired orientation of the slave unit 2.

A procedure for invoking the master/slave operation mode will be described. Upon the connection of the medical manipulator 1 to the power source, an initializing procedure is performed. A detector attached to the slave unit 3 measures the position and orientation of the slave unit 3. When necessary, the slave unit 3 is moved to a predetermined initial position and is stopped at the initial position. A detector attached to the master unit 2 measures the position and orientation of the master unit 2. Usually, the respective orientations of the master unit 2 and the slave unit 3 are different from each other. Therefore, the master unit 2 and the slave unit 3 must be aligned with each other.

An operator 10 gives an instruction requesting the start of the master/slave operation mode to the controller by operating a keyboard, a touch panel, a switch placed on the master unit 2, a switch on a control panel, a foot switch or a manipulator detector placed on a trocar tube 5 to detect the insertion of the medical manipulator 1 through the trocar tube 5 in the peritoneal cavity. Thus the mode of the medical manipulator 1 is changed from the unrestricted operation mode to the master/slave operation mode.

Upon the reception of a master/slave operation start command, the medical manipulator 1 starts operating in the transitional master/slave operation mode. The medical manipulator 1 calculates an angular difference between each of angular positions of a plurality of shafts of the master unit 2 and each of angular positions of a plurality of shafts of the slave unit 3 respectively corresponding to the plurality of master shafts of the master unit 2. An attitude difference, a vector quantity in three-dimensional space, is calculated from the angular differences. Reference is made to the operation programs of the control program 8 to determine a desired value classified beforehand by the magnitude of vector quantity. Thus, an operation for starting operations in the master/slave operation mode necessary for establishing a desired relation between the respective orientations of the master unit 2 and the slave unit 3 is determined by determining the desired value for control by making reference to the operation program of the control programs 8, and determining the relation between the desired value for control and the angles representing the present orientation.

A unitary master/slave manipulator (master-slave combined manipulator), in which a master unit 2 and a slave unit 3 are interconnected, does not need positioning operations and needs only orientation aligning operations. Since the master unit 2 and the slave unit 3 operate in expectable operating ranges, respectively, any problems that deteriorate safety do not arise even if the respective joint-link pairs of the master unit 2 and the slave unit 3 operate automatically.

A separate master/slave manipulator, in which a master unit 2 and a slave unit 3 are separate from each other, can be handled similarly to the unitary master/slave manipulator by defining that a desired position of the slave unit 3 is a deviation from a position at an initial stage subsequent to the start of a master/slave operation.

An angular position difference $\Delta\theta$ is expressed by:

$$\Delta\theta = \theta_{master} - \theta_{slave} \quad (1)$$

where $\theta_{master}$ is a measured angular position of the master unit 2 and $\theta_{slave}$ is a measured angular position of the slave unit 3. An angular position difference may be calculated for each driveshaft or for each orientation axis. A plurality of shafts may be individually controlled or a combination of a plurality of shafts may be controlled in a set.

A transition control procedure for starting a master/slave operation will be described with reference to FIGS. 3 and 4. Generally, the transition control procedure for starting a master/slave operation reduces the angular position difference between the master unit 2 and the slave unit 3 in an accelerated orientation difference reducing operation mode in an initial state where the angular position difference between the master unit 2 and the slave unit 3 is large, namely, a period immediately after a master/slave operation start signal requesting the start of a master/slave operation has been given to the medical manipulator 1, to reduce the angular position difference rapidly, reduces the angular position difference in a uniform-speed orientation difference reducing operation mode in a proper time, and reduces the angular position difference to a negligibly small value in a decelerated orientation difference reducing operation for fine adjustment.

Figure 3:
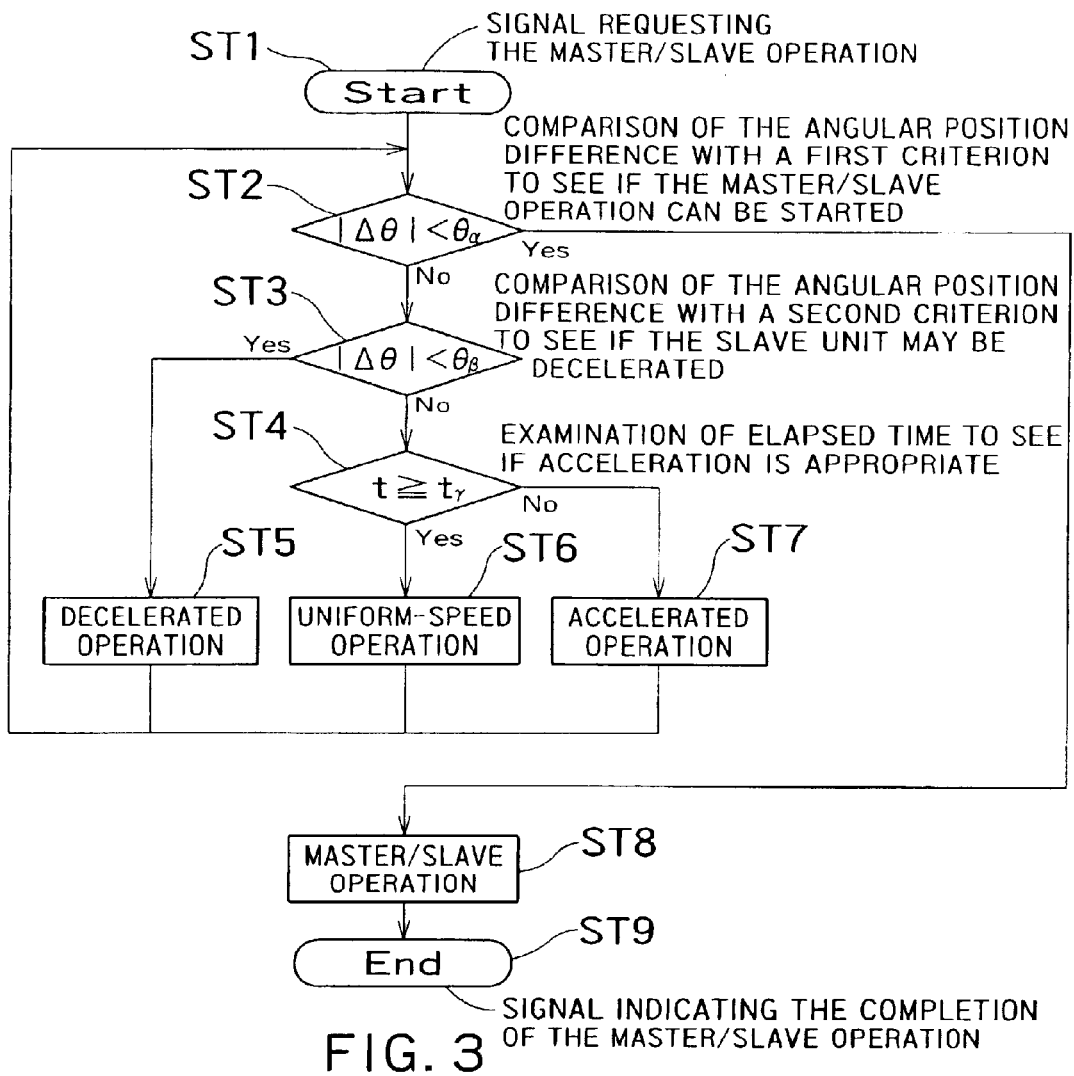
FIG. 3 is a flow chart of an operation determining procedure to be carried out in a transitional master/slave operation mode.
Figure 4:
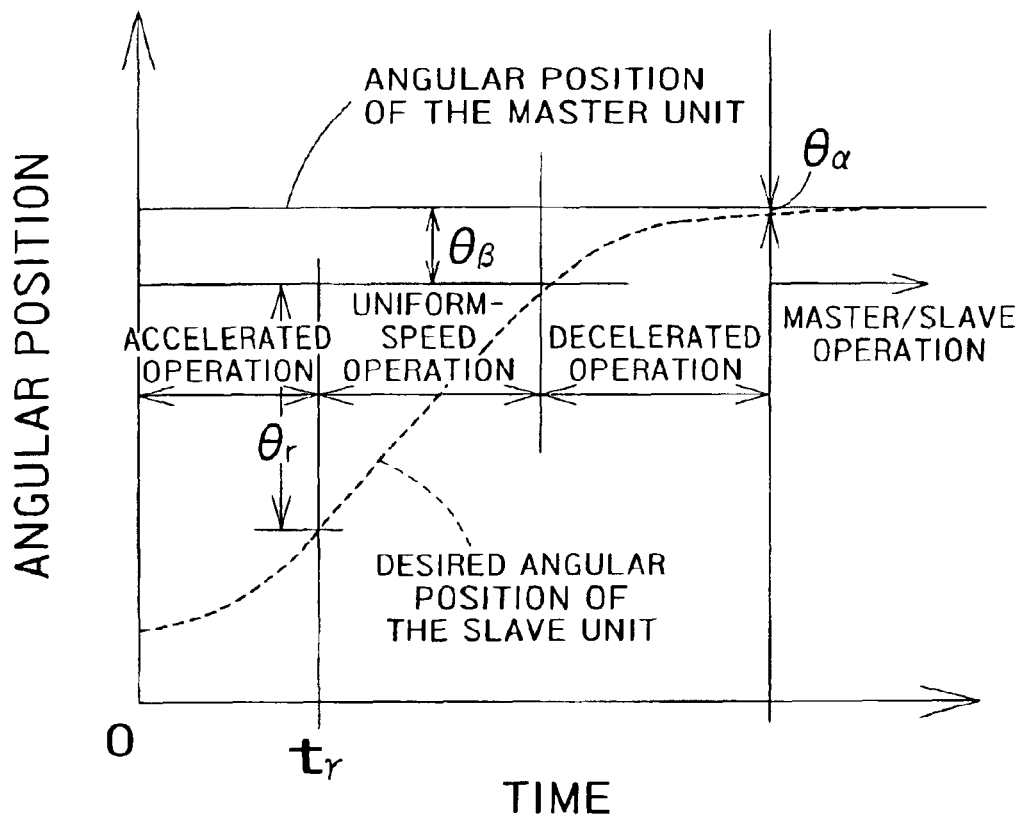
FIG. 4 is a diagram of a control program defining the relation between an orientation difference to be controlled in a control time between the measurement of the orientation difference and the reduction to zero of the orientation difference.

Referring to FIG. 3, a master/slave operation start signal requesting the start of the master/slave operation is give to the medical manipulator 1 in step ST1 and the transition control procedure is started. The angular position difference between the master unit 2 and the slave unit 3 is measured, reference is made to the control program 8, and a desired angular position of the slave unit 3 (desired value for control) necessary for making the angular position of the slave unit 3 coincide with that of the master unit 2 is determined. As mentioned above, reference is made to the operation program included in the control program 8 and corresponding to the present angular position difference between the master unit 2 and the slave unit 3. More specifically, the operation program included in the control program 8 specifies the accelerated operation mode, the uniform-speed operation mode or the decelerated operation mode according to the present angular position difference between the master unit 2 and the slave unit 3 as shown in FIG. 4. The desired angular position of the slave unit 3 varies along a dotted curve shown in FIG. 4 so as to approach the angular position of the master unit 3 with time after the input of the master/slave operation start signal.

In step ST2, a query is made to see if the present angular position difference between the master unit 2 and the slave unit 3 is small enough to start the master/slave operation. In step ST2, the present angular position difference between the master unit 2 and the slave unit 3 is compared with a value $\theta_\alpha$ of a first parameter for determining whether the respective angular positions of the master unit 2 and the slave unit 3 are equal or substantially equal to each other.

$$|\Delta\theta| < \theta_\alpha \quad (2)$$

If the response in step ST2 is affirmative, the master/slave operation is started in step ST8. If the response in step ST2 is negative, i.e., if Expression (2) is not satisfied, a query is made in step ST3 to see if the present angular position difference between the master unit 2 and the slave unit 3 is small enough to move the slave unit 3 by the decelerated orientation difference reducing operation. In step ST3, the present angular position difference is compared with a value $\theta_\beta$ ($\theta_\beta > \theta_\alpha$) of a second parameter for determining whether the angular position of the slave unit 3 is close to that of the master unit 2. The value $\theta_\beta$ is a threshold value for deciding whether or not the angular position of the slave unit 3 is close to that of the master unit 2.

$$|\Delta\theta| < \theta_\beta \quad (3)$$

If Expression (3) is satisfied, the movement of the slave unit 3 is decelerated in step ST7 to bring the slave unit 3 into alignment with the master unit 3. The slave unit 3 is moved in a direction to reduce the angular position difference. The moving direction of the slave unit 3 is indicated by the sign of the angular position difference $\Delta\theta$.

If Expression (3) is not satisfied, it is decided that the angular position difference between the master unit 2 and the slave unit 3 is still large.

In step ST4, an elapsed time t elapsed since the input of the master/slave operation start signal is compared with a parametric time $t_\gamma$, i.e., a parameter indicating a threshold time period from the input of the master/slave operation start signal, to see whether Expression (4) is satisfied or whether Expression (5) is satisfied.

The comparison of the elapsed time t with the parametric time $t_\gamma$ is based on the following idea. Usually, the orientation difference between the master unit 2 and the slave unit 3 is large at a time point when the master/slave operation start signal is given. Therefore, the orientation difference can be efficiently reduced by the accelerated orientation difference reducing operation in the accelerated operation mode. Therefore, the slave unit 3 is moved in the accelerated operation mode in the range of the parametric time $t_\gamma$ after the input of the master/slave operation start signal to reduce the orientation difference between the master unit 2 and the slave unit 3 as quickly as possible.

$$t < t_\gamma \quad (4)$$

If Expression (4) is satisfied, the movement of the slave unit 3 is accelerated to a predetermined speed in step ST5 unless Expression (2) or (3) is satisfied.

$$t > t_\gamma \quad (5)$$

If Expression (5) is satisfied, the slave unit 3 is moved in step ST6 for a uniform-speed orientation difference reducing operation at speeds lower than those for the accelerated orientation difference reducing operation to align the slave unit 3 with the master unit 2. If the accelerated orientation difference reducing operation is unnecessary, $t_\gamma=0$. The elapsed time t compared with the parametric time $t_\gamma$ is reset to zero when the decelerated orientation difference reducing operation is started in step ST7. The slave unit 3 is moved for the decelerated orientation difference reducing operation in step ST7, and then step ST2 is executed again to see if Expression (2) is satisfied. If Expression (2) is satisfied, the master/slave operation is started in step ST8 and a master/slave operation starting procedure completion signal is provided in step ST9.

The foregoing master/slave aligning procedure is executed periodically to align the slave unit 3 automatically with the master unit 2. The master/slave aligning procedure is executed also when the master/slave operation is resumed after interruption.

Figure 5:
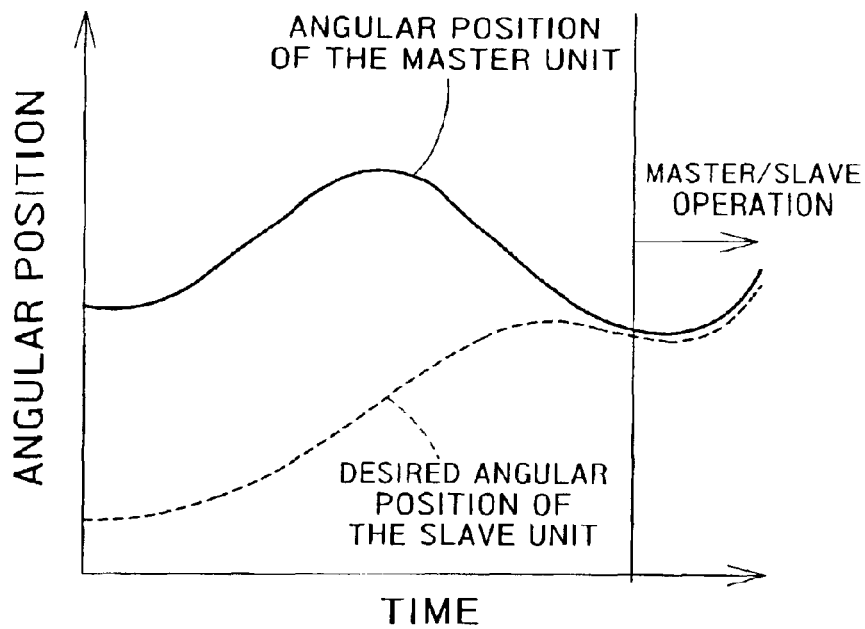
FIG. 5 is a graph of assistance in explaining a control operation to be performed when the master unit moves in a transitional master/slave operation mode.

The orientation of the master unit 2 may be changed before the slave unit 3 is aligned with the master unit 2 because the foregoing decisions are repeated sequentially from moment to moment. When the master/slave operation is started by the transition control procedure, the desired angular position of the slave unit 3 as shown in FIG. 5 is produced. Therefore, the operator 10 does not need to perform work for aligning the slave unit 3 with the master unit 2 as well as work for keeping the master unit 2 stationary until the operation for aligning the slave unit 3 with the master unit 2 is completed. Thus, the medical manipulator is easy to operate.

If the operator 10 moves the master unit 2 in a direction to increase the angular position difference between the master unit 2 and the slave unit 3 in an operating range of the master unit 2, the arithmetic control device 12 perceives the increase of the angular position difference between the master unit 2 and the slave unit 3, and operates the slave unit 3 according to the result of comparison of the angular position difference $\Delta\theta$ with the parametric angle $\theta_\beta$ or the like to align the slave unit 3 with the master unit 2.

Figure 6:
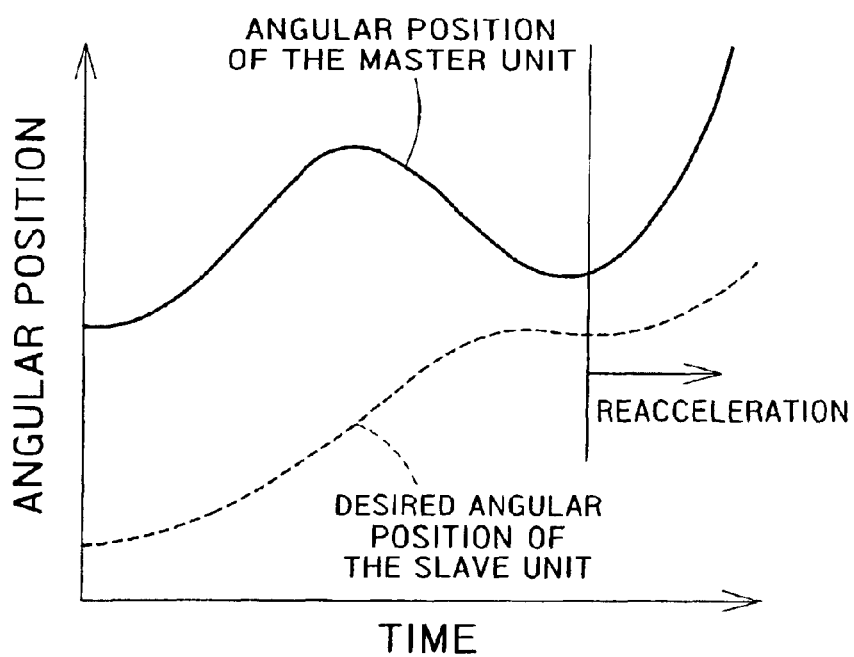
FIG. 6 is a graph of assistance in explaining a control operation for accelerating the slave unit again by moving the master unit in a direction away from the slave unit to increase the orientation difference.

As mentioned above, if the operator 10 moves the master unit 2 such that the angular position of the master unit 2 approaches that of the slave unit 3 during the aligning operation for aligning the slave unit 3 with the master unit 2, the aligning operation can be completed quickly when the speed at which the slave unit 3 is moved to align the slave unit 3 with the master unit 2 is changed according to the angular position difference. When it is desired to move the slave unit 3 further in the present moving direction at the initial stage of operation of the slave unit 3 in the decelerated operation mode during the aligning operation, the slave unit 3 can be moved further in the present moving direction by moving the master unit 2 relative to the slave unit 3 in a direction to increase the angular position difference as shown in FIG. 6.

Thus, the medical manipulator is capable of taking proper steps to meet the situation even if unexpected accidents occur during medical operations.

The angular position difference $\Delta\theta$ may be compared with a third parametric angle $\theta_\gamma$ ($\theta_\gamma > \theta_\beta$) (FIG. 4), and the accelerated operation mode may be used when the angular position difference $\Delta\theta$ is greater than the third parametric angle $\theta_\gamma$ instead of using the accelerated operation mode after the time longer than the parametric time $t_{65}$ has elapsed since the input of the master/slave operation start signal.

The moving speed $\dot{\theta}_{master}$ of the master unit 2, the acceleration $\alpha_{master}$ of the master unit, the speed $\Delta\dot{\theta}$ of the angular difference between the master unit 2 and the slave unit 3 and the acceleration $\Delta\alpha$ of the angular position difference between the master unit 2 and the slave unit 3 may be used in addition to or instead of the angular position difference between the master unit 2 and the slave unit 3 and the operation time as criteria to determine a desired angular position for the slave unit 3 to move the slave unit 3 for a transitory operation. The operator's intension can be more readily reflected on the motions of the slave unit 3 by interconnecting the master unit 2 and the slave unit 3 during the transitional master/slave operation by a virtual dashpot formed by using speed and acceleration.

As apparent from the foregoing description, the medical manipulator embodying the present invention controls the slave unit 3 so that the orientation difference measured by the orientation difference measuring unit 6 is reduced to zero and the slave unit 3 is aligned with the master unit 2 in the transient master/slave operation mode in which the unrestricted operation mode changes into the master/slave operation mode. Thus, the medial manipulator is easy to operate, the slave unit 3 can be automatically aligned with the master unit 2 and the burden on the operator 10 can be reduced. The operator's intention can be reflected on the master/slave aligning operation. Thus, the medial manipulator is safe and easy to operate.

Although the invention has been described as applied to the unitary medical manipulator in which the respective orientations of the master unit 2 and the slave unit 3 conform to a predetermined relation, the present invention is not limited thereto in its practical application and is applicable to a separate medical manipulator, which is operated teleoperatingly, having a master unit 2 and a slave unit 3 which are separated positionally, and capable of controlling position and orientation individually.

Thus, the present invention provides a medical manipulator excellent in operability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their eqivalents.

What is claimed is:

1. A medical manipulator of a master/slave system comprising:
    a master unit provided with an operation control portion;
    a slave unit provided with a working device;
    an orientation difference measuring means for measuring an orientation difference between an orientation of the master unit and that of the slave unit;
    a control means for controlling the slave unit to adjust the orientation of the slave unit to that of the master unit so that the orientation difference is reduced to zero in a transient master/slave operation mode in which an unrestricted operation mode changes into a master/slave operation mode; and a control program defining the relation between the orientation difference and control time for a control period between time of reception of a signal requesting transition from the unrestricted operation mode to the master/slave operation mode and time when the orientation difference is reduced to zero, wherein the control means controls the slave unit according to the control program.

2. The medical manipulator according to claim 1, further comprising an interlocking mechanism interlocking the master unit and the slave unit.

3. The medical manipulator according to claim 1, wherein the control program includes operation programs classified by the magnitude of the orientation difference and respectively corresponding to the orientation differences measured by the orientation difference measuring means, the control means selects one of the operation programs according to the magnitude of the orientation difference measured by the orientation difference measuring means, and controls the slave unit according to the selected operation program.

4. The medical manipulator according to claim 3, wherein the operation programs included in the control program are an accelerated operation program for controlling the slave unit for an accelerated orientation difference reducing operation, a uniform-speed operation program for controlling the slave unit for a uniform-speed orientation difference reducing operation, and a decelerated operation program for controlling the slave unit for a decelerated orientation difference reducing operation.

5. The medical manipulator according to claim 4, wherein an acceleration at which the slave unit is moved for the accelerated orientation difference reducing operation according to the accelerated operation program, a speed at which the slave unit is moved for the uniform-speed orientation difference reducing operation according to the uniform-speed operation program, and the deceleration at which the slave unit is moved for the decelerated orientation difference reducing operation according to the decelerated operation program are included in the control program.

6. The medical manipulator according to claim 4, wherein the control means is capable of controlling the slave unit according to the accelerated operation program regardless of the magnitude of the orientation difference in a predetermined period after the reception of the signal requesting transition to the master/slave operation mode.

7. The medical manipulator according to claim 1, wherein the orientation difference measuring means measures orientation differences sequentially, and the control means refers to the control program for each of the sequentially measured orientation differences to control the slave unit.

8. The medical manipulator according to claim 7, wherein the control means refers to the control program for each of the sequentially measured orientation differences to control the slave unit when the orientation of the master unit changes with time.

9. The medical manipulator according to claim 7, wherein the control means refers to the control program for each of the sequentially measured orientation differences to control the slave unit while the orientation difference is not reduced to zero and the orientation of the slave unit changes with time.

10. The medical manipulator according to claim 1, wherein the orientation measuring means includes a first angle measuring device which measures an angular position of the master unit, a second angle measuring device which measures an angular position of the slave unit, and an orientation difference calculating device which calculates an orientation difference from the angular positions measured by the first and the second angular position measuring device.

11. A method of controlling a medical manipulator of a master/slave system, comprising:

measuring an orientation difference between a master unit provided with an operation control portion and a slave unit provided with a working device by an orientation difference measuring device in a transient master/slave operation mode in which an operation mode changes from an unrestricted master/slave operation mode to a master/slave operation mode and the orientation difference between the master unit and the slave unit is reduced to zero; and controlling the slave unit by a control device on the basis of the orientation difference measured by the orientation difference measuring device to adjust an orientation of the slave unit to that of the master unit so that the orientation difference is reduced to zero, wherein controlling the slave unit controls the slave unit by the control device according to a control program defining the relation between the orientation difference and control time for a control period between time of reception of a signal requesting transition from an unrestricted operation mode to a master/slave operation mode and time when the orientation difference is reduced to zero.

12. The method of controlling a medical manipulator of a master/slave system according to claim 11, wherein the control program includes operation programs classified by a magnitude of the orientation difference and respectively corresponding to the orientation differences measured by the orientation difference measuring device, and controlling the slave unit selects one of the operation programs according to the magnitude of the orientation difference measured by the orientation difference measuring device, and controls the slave unit according to the selected operation program.

13. The method of controlling a medical manipulator of a master/slave system according to claim 12, wherein the operation programs included in the control program are an accelerated operation program for controlling the slave unit for an accelerated operation to reduce the orientation difference, a uniform-speed operation program for controlling the slave unit for a uniform-speed operation to reduce the orientation difference, and a decelerated operation program for controlling the slave unit for a decelerated operation to reduce the orientation difference, controlling the slave unit compares the orientation difference with a predetermined first angle as a criterion on the basis of which a decision is made as to whether or not the orientation difference is negligibly small, terminates the transitional master/slave operation mode when the orientation difference is not greater than the predetermined first angle, and compares the orientation difference with a predetermined second angle greater than the predetermined first angle when the orientation difference is greater than the predetermined first angle, moves the slave unit for the decelerated operation according to the decelerated operation program when the orientation difference is not greater than the predetermined second angle, compares a time elapsed since the reception of a signal requesting transition to the master/slave operation mode with a predetermined time when the orientation difference is greater than the predetermined second angle, moves the slave unit for the uniform-speed operation according to the uniform-speed operation program when the elapsed time is longer than the predetermined time or for the accelerated operation according to the accelerated operation program when the elapsed time is shorter than the predetermined time.

14. The method of controlling a medical manipulator of a master/slave system according to claim 11, wherein the orientation difference measuring device measures orientation differences sequentially, and the control device refers to the control program for each of the sequentially measured orientation differences in controlling the slave unit to control the slave unit.

15. The medical master/slave manipulator control method according to claim 14, wherein controlling the slave unit refers to the control programs for each of the sequentially measured orientation differences to control the slave unit when the orientation of the master unit changes with time.

16. The method of controlling a medical manipulator of a master/slave system according to claim 14, wherein controlling the slave unit refers to the control program for each of the sequentially measured orientation differences to control the slave unit when the orientation of the slave unit changes with time in a state where the orientation difference is not reduced to zero.

17. A medical manipulator of a master/slave system comprising:

a master unit provided with an operation control portion;

a slave unit provided with a working device;

an orientation difference measuring means for measuring an orientation difference between an orientation of the master unit and that of the slave unit; and a control means for controlling the slave unit to adjust the orientation of the slave unit to that of the master unit so that the orientation difference is reduced to zero in a transient master/slave operation mode in which an unrestricted operation mode changes into a master/slave operation mode, wherein the orientation measuring means includes a first angle measuring device which measures an angular position of the master unit, a second angle measuring device which measures an angular position of the slave unit, and an orientation difference calculating device which calculates an orientation difference from the angular positions measured by the first and the second angular position measuring device.

18. A method of controlling a medical manipulator of a master/slave system comprising:

measuring an orientation difference between a master unit provided with an operation control portion and a slave unit provided with a working device by an orientation difference measuring device in a transient master/slave operation mode in which an operation mode changes from an unrestricted master/slave operation mode to a master/slave operation mode and the orientation difference between the master unit and the slave unit is reduced to zero; and controlling the slave unit by a control device on the basis of the orientation difference measured by the orientation difference measuring device to adjust an orientation of the slave unit to that of the master unit so that the orientation difference is reduced to zero, wherein controlling the slave unit controls the slave unit by the control device according to a control program defining the relation between the orientation difference and control time for a control period between time of reception of a signal requesting transition from an unrestricted operation mode to a master/slave operation mode and time when the orientation difference is reduced to zero, and wherein controlling the slave unit refers to the control programs for each of the sequentially measured orientation differences to control the slave unit when the orientation of the master unit changes with time.

19. A method of controlling a medical manipulator of a master/slave system comprising:

measuring an orientation difference between a master unit provided with an operation control portion and a slave unit provided with a working device by an orientation difference measuring device in a transient master/slave operation mode in which an operation mode changes from an unrestricted master/slave operation mode to a master/slave operation mode and the orientation difference between the master unit and the slave unit is reduced to zero; and controlling the slave unit by a control device on the basis of the orientation difference measured by the orientation difference measuring device to adjust an orientation of the slave unit to that of the master unit so that the orientation difference is reduced to zero, wherein controlling the slave unit controls the slave unit by the control device according to a control program defining the relation between the orientation difference and control time for a control period between time of reception of a signal requesting transition from an unrestricted operation mode to a master/slave operation mode and time when the orientation difference is reduced to zero, and wherein controlling the slave unit refers to the control program for each of the sequentially measured orientation differences to control the slave unit when the orientation of the slave unit changes with time in a state where the orientation difference is not reduced to zero.

* * * * *